April 21, 1959      M. J. BROWN      2,883,610
GENERATOR PROTECTIVE SYSTEMS
Filed Oct. 26, 1955
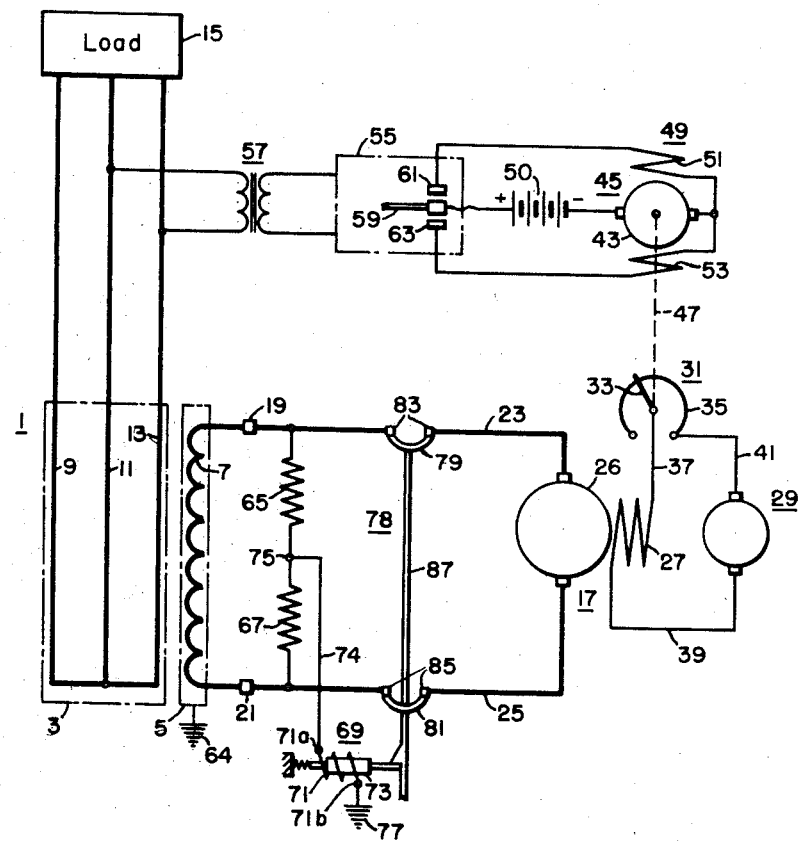
WITNESSES
Robert C. Baird
David M. Schiller
INVENTOR
Myron J. Brown.
BY C. L. Freedman
ATTORNEY

United States Patent Office 2,883,610
Patented Apr. 21, 1959.

2,883,610
GENERATOR PROTECTIVE SYSTEMS

Myron J. Brown, Forest Hills, Pa., assignor to Westinghouse Electric Corporation, East Pittsburgh, Pa., a corporation of Pennsylvania Application October 26, 1955, Serial No. 542,821

9 Claims. (Cl. 322—37)

This invention relates to an electrical system and has particular relation to a system including detecting means for detecting a ground connection of a field winding of dynamoelectric apparatus such as an electrical generator unit.

Electrical generator units have previously been constructed which include a field winding energizable to establish a magnetic flux field which cooperates with suitable output conductors to induce an output voltage in such conductors. For this purpose, the flux field and output conductors are arranged for movement relative to each other such that the output conductors intercept flux of the flux field. The field winding is customarily energized by an exciter device in the form of a direct-current generator.

Relative movement between the flux field and output windings may be provided either by securing the field winding to a rotor structure for rotation relative to fixed output windings carried by a stator structure, or by securing the output windings to a rotor structure for rotation relative to a fixed field winding carried by a stator structure. Regardless of which of these arrangements is employed, the field winding may become accidentally connected to ground through a circuit which includes portions of the generator unit. Such a ground connection ordinarily results from a weakening of the insulation provided for the field winding. Although a ground connection of the field winding is not in itself considered harmful, it does indicate the presence of weakened insulation of such winding which could result in the occurrence of a second ground connection of the winding causing serious damage.

In the past, a number of systems have been devised for detecting the presence of a ground connection of a generator field winding. As an example, a detecting system has been employed wherein two lamp devices of substantially equal resistance are connected in series circuit relation across the terminals of the field winding for energization from the exciter device. A suitable ground connection is made to a point in the series circuit intermediate the lamp devices. As will presently appear, such a system is ineffective to indicate a ground connection of certain points in the field winding.

In conventional generator units, it has been observed that the voltage difference between each terminal of the field winding and ground is equal to approximately one-half the voltage of the exciter device, and that the voltage difference between the center of the field winding and ground is equal to zero. Consequently, with the described detecting system, a ground connection of either terminal of the field winding, or a point adjacent thereto, will establish a short circuit path which shunts one of the lamp devices resulting in extinguishment of such lamp device. Such extinguishment is effective to provide an indication of the occurrence of the ground connection.

The detecting system described, however, is ineffective to indicate a ground connection of the center of the field winding or a point adjacent thereto. This is explained by considering the fact that if the center of the field winding, or a point adjacent thereto, becomes grounded, the voltage of the exciter device will still be divided substantially equally between the lamp devices with the result that the lamps will glow with substantially equal brilliance thereby preventing an indication of such ground connection.

According to the present invention, an electrical system is provided including a dynamoelectric device which may comprise a generator unit having a field winding with improved means for detecting a ground connection of the winding at any point in the winding. The system includes a pair of impedance means connected in series circuit relation across the terminals of the field winding for energization from a field winding exciter device. An electroresponsive device having a pair of input terminals is arranged to indicate when energized the occurrence of a ground connection of the field winding. For this purpose one of the input terminals is connected to a point in the series circuit intermediate the pair of impedance means, and the other input terminal is connected to ground.

In order to permit detection of a ground connection at any point in the field winding, the invention provides that the magnitude of impedance presented by one or both of the impedance means be automatically variable to thereby permit adjustment of the point in the field winding at which the voltage to the point intermediate the impedance means is zero from one location to another location in the field winding. For this purpose one or both of the impedance means may be in the form of a resistance element selected to exhibit a resistance having a magnitude which varies in response to changes in a condition to which such element is subjected.

According to a preferred embodiment of the invention, one of the resistance elements is selected to exhibit a resistance having a magnitude which is dependent upon the magnitude of voltage applied thereacross. To this end, the resistance element may conveniently be formed of a commercially available silicon carbide compound known as Thyrite which exhibits such variable resistance properties. In order to automatically effect periodic variations of the magnitude of resistance of the variable one of the resistance elements, the exciter device is conveniently arranged for energization under the control of a voltage regulator device which is responsive to the output voltage of the generator unit. With such an arrangement, the magnitude of voltage produced by the exciter device will vary in response to changes in magnitude of the output voltage to thereby cause a variation in the magnitude of resistance of the resistance element.

It is, therefore, an object of the invention to provide an electrical system including a dynamoelectric device with improved protective means for such apparatus.

It is another object of the invention to provide an electrical system including a dynamoelectric device having a field winding with improved means for detecting a ground connection of said field winding.

It is a further object of the invention to provide an electrical system including a generator unit having a field winding with improved means for detecting a ground connection of the field winding at any point in said field winding.

It is still another object of the invention to provide an electrical system including a generator unit having a field winding with a point in the field winding at zero voltage to an input terminal of and a detecting system for detecting a ground connection of the field winding including means for automatically transferring said zero voltage point from one location to another location in said field winding.

It is a still further object of the invention to provide an electrical system including a generator unit having a field winding with a field winding exciter device and a detecting system for detecting a ground connection of the field winding including impedance means connected across the field.

winding having an impedance variable with changes in voltage of the exciter device produced by operation of a regulator device responsive to output voltage of the generator unit.

Other objects of the invention will be apparent from the following description taken in conjunction with the accompanying drawing, in which the single figure illustrates in diagrammatic form an electrical system embodying the teachings of the invention.

Referring to the drawing, there is diagrammatically illustrated an electrical system including dynamoelectric apparatus respresented generally by the numeral 1. Although the invention may be applied to various types of dynamo-electric apparatus, it will be assumed for purposes of illustration that the apparatus 1 is in the form of an electrical generator unit.

As shown, the generator unit 1 includes a stator structure represented diagrammatically by the block 3 and a rotor structure diagrammatically represented by the block 5. The rotor structure 5 may be mounted for rotation relative to the stator structure 3 in any suitable manner.

In order to permit the establishment of a magnetic flux field, the unit 1 is provided with a field winding 7 which is diagrammatically illustrated in association with the rotor structure 5. However, the winding 7 may be secured to the stator structure 3 if desired. The winding 7 is effective when energized to establish a flux field which rotates with the structure 5 relative to the structure 3. The winding 7 comprises a conductor member which is surrounded by an insulating sheath (not shown) for preventing engagement of the conductor member with the rotor structure 5 which is generally formed of an electroconductive material.

In order to permit the generation of electrical energy, the unit 1 further includes output conductors 9, 11 and 13 shown associated with the stator structure 3 to provide a three-phase alternating-current output circuit. Portions of the conductors 9, 11 and 13 are positioned in the path of the flux field produced by energization of the winding 7. As is understood in the art, rotation of the flux field relative to the conductors 9, 11 and 13 is effective to induce voltages in the conductors which appear between pairs of such conductors. As understood in the art, the magnitudes of these voltages are dependent upon the degree of energization of the winding 7. A suitable load device 15 may be connected to the conductors for energization from the unit 1.

In order to effect energization of the winding 7 to establish a flux field, a suitable exciter device illustrated in the form of a direct-current generator 17 is connected across the winding 7. In order to permit the transfer of current from the generator 17 to the winding 7 suitable slip rings 19 and 21 are connected to the terminals of the winding 7 with conductors 23 and 25 connected between the slip rings and the armature 26 of the generator 17.

The generator 17 includes a field winding 27 for a purpose similar to that of the winding 7. When the winding 27 is energized, a direct voltage is established across the conductors 23 and 25 effective to properly energize the winding 7. The magnitude of this voltage is substantially proportional to the degree of energization of the winding 27 of the generator 17.

For the purpose of energizing the field winding 27 there is provided an auxiliary exciter device in the form of a direct-current generator 29 which is connected across the winding 27. In order to control the degree of energization of the winding 27 to thereby control the magnitude of the voltage appearing between the conductors 9, 11 and 13 a suitable adjustable resistor or rheostat 31 is connected between the winding 27 and the generator 29. The rheostat 31 is shown diagrammatically as including an electroconductive arm 33 arranged for adjustable contact with a resistance member 35. One terminal of the winding 27 is connected to the arm 33 through a conductor 37 whereas the remaining terminal of the winding 27 is connected to one terminal of the generator 29 through a conductor 39. The other terminal of the generator 29 is connected to a terminal of the resistance member 35 through a conductor 41.

For the purpose of varying energization of the winding 27 so as to maintain the magnitude of voltages across the conductors 9, 11 and 13 substantially constant, the arm 33 of the rheostat 31 is arranged for adjustment in response to changes in magnitudes of such voltages. To this end, the arm 33 is mechanically coupled to the armature 43 of a motor 45 as indicated by the dotted line 47 for rotation in accordance with rotation of the armature 43. The motor 45 is shown in the form of a series connected motor including a field winding 49 which is connected in series with a winding (not shown) of the armature 43 for energization from a source of direct current which may comprise a battery 50. As shown, the winding 49 is split into two portions 51 and 53 each energizable from the battery 50 through a separate path. Each of the winding portions 51 and 53 is arranged to produce when energized a separate direction of rotation of the armature 43 and consequently, of the arm 33 of the rheostat 31.

In order to control the direction of rotation of the armature 43 in accordance with changes in the magnitudes of voltages across the conductors 9, 11 and 13, there is provided a voltage regulator device of any suitable construction represented by the block 55. The device 55 is shown connected for energization from the conductors 11 and 13 in accordance with voltage therebetween through a suitable voltage transformer 57. The device 55 is arranged to effect energization of one or the other of the winding portions 51 and 53 depending upon the direction of change in the magnitude of voltage across the conductors 11 and 13 from the regulated value of such voltage.

To this end, the device 55 includes an electroconductive contact 59 arranged for movement in response to a change in the magnitude of the regulated voltage from the regulated value between a pair of spaced fixed electroconductive contacts 61 and 63. The contact 59 is shown connected to one terminal of the battery 50 so as to effect energization of each of the winding portions 51 and 53 when in engagement with a separate one of the contacts 61 and 63. The device 55 operates such that if the value of the regulated voltage is changed from the regulated value, the contact 59 is moved sufficiently to engage one of the contacts 61 and 63 for energizing the motor 45 to cause rotation of the armature 43 in a direction and by an amount such that energization of the winding 7 of the generator 1 is varied to restore the value of the regulated voltage to the desired regulated value. The parts of the system thus far described are well known in the art and for this reason further description thereof is believed unnecessary.

In the field of electrical energy generation it has been found desirable to provide means for detecting a ground connection of a field winding of a generator unit. Such a ground connection is generally caused by a break in the insulating sheath of the winding resulting in engagement of the conductor of the winding with a portion of the generator. For example, a break in the insulating sheath (not shown) of the winding 7 of the generator 1 would result in direct engagement of the conductor of the winding with the electroconductive rotor structure 5.

In conventional installations, the rotor structure, such as the structure 5, is connected to ground as indicated by the numeral 64 through an electroconductive path including the associated rotor shaft, a bearing assembly for the shaft and a support for the generator unit which usually mounts the bearing assembly. The above-mentioned parts are not illustrated in the drawing. Although such ground connection of the field winding is not in itself considered harmful, it does indicate the presence of weakened insulation of the winding which could result in the occurrence of a second ground connection of the winding causing serious damage.

In the past a number of systems have been devised for detecting the presence of a ground connection of a generator field winding. As previously described one such system includes a pair of identical lamp devices connected in series circuit relation across the field winding for energization from the associated exciter device with a point of the series circuit intermediate the lamp devices being connected to ground. Such a system, however, is ineffective to indicate a ground connection at the center of the field winding and points of the winding adjacent thereto.

This may be explained by considering the observation that in a generating system such as is illustrated, the voltage difference between each terminal of the winding 7 and the rotor structure 5 is equal to approximately one-half the voltage of the generator 17, and the voltage difference between the center of the winding 7 and the structure 5 is equal to zero. Such voltage distribution is believed to result from capacitance between the winding 7 and the structure 5. Consequently, with the described lamp system, the occurrence of a ground connection at the center of the winding does not disturb the voltages across the lamp devices with the result that such a ground connection cannot be detected.

According to the present invention an electrical system is provided which includes a generator unit having a field winding with improved means for detecting a ground connection of the winding at any point in the winding. The invention provides detecting means wherein the point of the field winding at which the voltage to an input terminal of the detecting means is zero is automatically transferred from one location to another location in the winding at random intervals to thereby permit detection of a ground connection at any point in the winding.

As illustrated in the drawing, the ground detecting system includes a pair of impedance means preferably in the form of resistance elements 65 and 67 connected in series circuit relation across the winding 7. In order to provide an indication of a ground connection of the winding 7, a suitable electroresponsive device 69 is connected to be energized upon the occurrence of such a ground connection. The device 69 is illustrated in the form of a latching solenoid including an energizing winding 71 having a pair of input terminals 71a and 71b. The winding 71 surrounds a suitable magnetic armature 73 which is movable in response to energization of the winding 71. As shown in the drawing, the terminal 71a of the winding 71 is connected to a point intermediate the resistance elements 65 and 67 through a conductor 74 with the connection indicated by the numeral 75, and the terminal 71b of the winding 71 is connected to ground with such connection indicated by the numeral 77.

Conveniently, the solenoid 69 is arranged to operate suitable circuit breaker means 78 associated with the conductors 23 and 25 of the circuit which includes the winding 7. The breaker means 78 is diagrammatically illustrated as comprising a pair of electroconductive contacts 79 and 81 associated with spaced contacts 83 and spaced contacts 85 of the conductors 23 and 25 respectively. The contacts 79 and 81 are shown mechanically connected together by a rod 87 for simultaneous movement in response to energization of the winding 71 of the solenoid 69. The solenoid 69 is shown in a deenergized condition with the breaker means 78 in a circuit establishing position.

In order to permit detection of a ground connection at any point in the winding 7, the invention provides that one or both of the elements 65 and 67 be selected to exhibit resistance having a magnitude which varies in response to changes in the magnitude of voltage applied thereacross. Such a resistance variation is effective to transfer the point in the winding 7 at which the voltage to the point 75 is zero from one location to another location in the winding 7. This arrangement is effective to permit the detection of a ground connection at any point in the winding 7 as will be presently described.

For this purpose one of the resistance elements 65 and 67 may be formed of a commercially available silicon carbide compound known as Thyrite which exhibits such variable resistance properties. If it is desired that both of the elements 65 and 67 exhibit variable resistance properties, they should be selected so that the magnitudes of resistance thereof change in opposite directions in response to a variation in the magnitude of voltage applied thereacross. For example, one of the resistance elements may be formed of Thyrite which exhibits a decreasing resistance in response to an increase in the applied voltage, and the other resistance element may assume the form of a hot-wire device which has the property of increasing resistance in response to an increase in the voltage applied thereto. The elements 65 and 67 are conveniently connected for energization from the generator 17.

It will be recalled that the magnitude of voltage produced by the generator 17 is variable under the control of the motor 45 and the regulator 55. With such arrangement any change in the magnitude of voltage across the conductors 11 and 13 will result in a variation of the magnitude of voltage of the generator 17 and consequently, of resistance of the variable one of the elements 65 and 67. In conventional generating installations employed for supplying power to distribution systems different resistance variations can be expected to occur with sufficient frequency to assure the eventual detection of a ground connection at any point in the winding 7. The elements 65 and 67 are selected to exhibit substantially the same resistance for normal voltage of the generator 17 produced when voltage across the conductors 11 and 13 is at the regulated value. This arrangement causes the approximate center of the winding 7 to have a voltage to the point 75 which is equal to zero. The operation of the system may be described as follows.

Let it be assumed that voltage across the conductors 11 and 13 has a value equal to the desired regulated value. Then the voltage between each terminal of the winding 7 and the structure 5 is equal to substantially one-half the magnitude of voltage of the generator 17, and the voltage between the center of the winding 7 and the structure 5 is equal to zero. Consequently, a ground connection at either terminal of the winding 7, or a point adjacent thereto, causes a current to flow through the winding 71 of the solenoid 69 to energize the solenoid for operating the breaker means 78 to a circuit interrupting position. However, if a ground connection occurs at the approximate center of the winding 7, there is no current circulated through the winding 71 of the solenoid and the solenoid remains in a deenergized state to maintain the circuit establishing position of the breaker means 78 as illustrated in the drawing.

Let it now be assumed that the magnitude of voltage across the conductors 11 and 13 is changed from the regulated value to thereby effect a change in the magnitude of voltage of the generator 17. Then the magnitude of resistance of the variable one of the elements 65 and 67 is varied from the magnitude thereof prior to such voltage changes so that voltage of the generator 17 is unequally distributed between the elements 65 and 67. As a result, the point of the winding 7 at which the voltage to the point 75 is zero is transferred from approximately the center of the winding 7 to another location of the winding 7. Consequently, the magnitude of voltage between the approximate center of the winding 7 and the point 75 now differs from zero. If a ground connection should occur at the approximate center of the winding under these conditions a current will be circulated through the winding 71 of the solenoid to thereby effect energization of the solenoid for operating the breaker means 78.

Although the invention has been described with reference to certain specific embodiments thereof, numerous modifications are possible and it is intended to cover all modifications falling within the spirit and scope of the invention.

I claim as my invention:

1. In an electrical system, a dynamoelectric device including a field winding energizable to establish a magnetic flux field, a pair of impedance means connected in series relation across said field winding, at least one of said impedance means exhibiting an impedance having a magnitude which varies in response to changes in a variable condition occurring in the system, an electroresponsive device effective when energized to indicate the occurrence of a ground connection of said field winding, said electroresponsive device including a pair of terminals, one of said terminals being connected to a point intermediate said pair of impedance means, and a ground connection for the other of said terminals.

2. In an electrical system, a dynamoelectric device including a field winding energizable to establish a magnetic flux field, a pair of impedance means connected in series relation across said field winding, each of said impedance means exhibiting an impedance having a magnitude dependent upon the magnitude of voltage applied thereacross such that the magnitudes of said impedances vary in opposing directions in response to a change in the magnitude of said applied voltage, an electroresponsive device effective when energized to indicate the occurrence of a ground connection of said field winding, said electroresponsive device including a pair of terminals, one of said terminals being connected to a point intermediate said pair of impedance means, and a ground connection for the other of said terminals.

3. In an electrical system, a dynamoelectric device including a field winding energizable to establish a magnetic flux field, a pair of impedance means connected in series relation across said field winding, at least one of said impedance means exhibiting an impedance having a magnitude dependent upon the magnitude of voltage applied thereacross, an electroresponsive device effective when energized to indicate the occurrence of a ground connection of said field winding, said electroresponsive device including a pair of terminals, one of said terminals being connected to a point intermediate said pair of impedance means, a ground connection for the other of said terminals, and a source of voltage connected across said impedance means having a variable magnitude.

4. In an electrical system, a dynamoelectric device including a field winding energizable to establish a magnetic flux field, a source of direct voltage connected across the field winding to energize said field winding, a pair of impedance means connected in series relation across said field winding, at least one of said impedance means exhibiting an impedance having a magnitude dependent upon the magnitude of said direct voltage, an electroresponsive device effective when energized to indicate the occurrence of a ground connection of said field winding, said electroresponsive device including a pair of terminals, one of said terminals being connected to a point intermediate said pair of impedance means, a ground connection for the other of said terminals, and means for varying the magnitude of said direct voltage.

5. In an electrical system, a dynamoelectric device including a field winding energizable to establish a magnetic flux field, a source of variable direct voltage connected across the field winding to energize said field winding, said field winding including a point at which the voltage to a terminal of the system is substantially zero, an electroresponsive device connected to said terminal for energization upon the occurrence of a ground connection at points of said field winding spaced from said zero voltage point, and means effective in response to variations of said direct voltage for transferring said zero voltage point from one location to another location of said field winding.

6. In an electrical system, a dynamoelectric generator including a field winding energizable to establish a magnetic flux field, output conductor means having a output voltage established by action of said magnetic field, a source of direct voltage connected across the field winding to energize said field winding, a pair of impedance means connected in series relation across said field winding, at least one of said impedance means exhibiting an impedance having a magnitude dependent upon the magnitude of said direct voltage, an electroresponsive device effective when energized to indicate the occurrence of a ground connection of said field winding, said electroresponsive device including a pair of terminals, one of said terminals being connected to a point intermediate said pair of impedance means, a ground connection for the other of said terminals, regulator means for regulating the magnitude of said output voltage between preselected limits, and control means operable by said regulator means to vary the magnitude of said direct voltage in response to variations of said output voltage.

7. In a device for detecting a ground connection of a generator field winding, a pair of series connected impedance means to be connected across the field winding, at least one of said impedance means exhibiting an impedance having a magnitude variable in response to changes in the magnitude of voltage applied thereacross, and an electroresponsive device effective when energized to indicate the occurrence of such ground connection, said electroresponsive device including a first terminal connected to a point intermediate said pair of impedance means, and a second terminal to be connected to ground.

8. In an electrical system, circuit means including electroconductive means, impedance means connected in parallel relation with said electroconductive means, at least a portion of said impedance means exhibiting an impedance having a magnitude dependent upon the magnitude of voltage applied thereacross, an electroresponsive device effective when energized to indicate the ocurrence of a ground connection of said electroconductive means, said electroresponsive device including a pair of energizable terminals, one of said energizable terminals being connected to a point intermediate the terminal means of said impedance means, a ground connection for the other of said energizable terminals, and a source of voltage connected across said impedance means having a variable magnitude, said electroconductive means including a point at which the voltage to said one of said energizable terminals is substantially zero.

9. In an electrical system, circuit means including electroconductive means, a source of variable direct voltage connected across the electroconductive means to energize said electroconductive means, said electroconductive means including a point at which the voltage to a terminal of the system is substantially zero, an electroresponsive device connected to said terminal for energization upon the occurrence of a ground connection at points of said electroconductive means spaced from said zero voltage point, and means effective in response to variations of said direct voltage for transferring said zero voltage point from one location to another location of said electroconductive means.

References Cited in the file of this patent

UNITED STATES PATENTS

| 2,079,636 | Sharp | May 11, 1937 |
| 2,324,825 | Crary | July 20, 1943 |
| 2,700,125 | King et al. | Jan. 18, 1955 |

FOREIGN PATENTS

| 453,585 | Great Britain | May 16, 1936 |